A. M. DE S. GREAVES.
TEMPERATURE ALARM SYSTEM FOR RADIATORS OF MOTOR VEHICLES.
APPLICATION FILED JAN. 16, 1920.
1,386,492.
Patented Aug. 2, 1921.
2 SHEETS—SHEET 1.
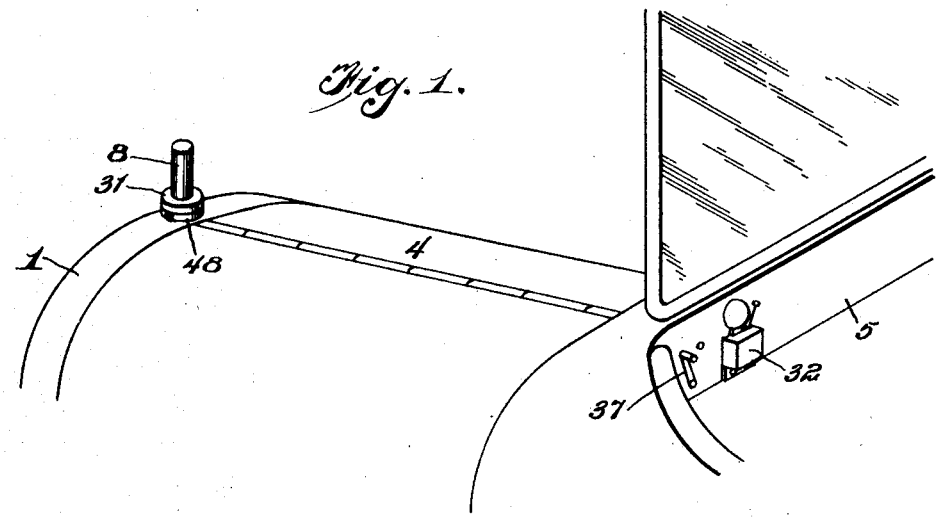
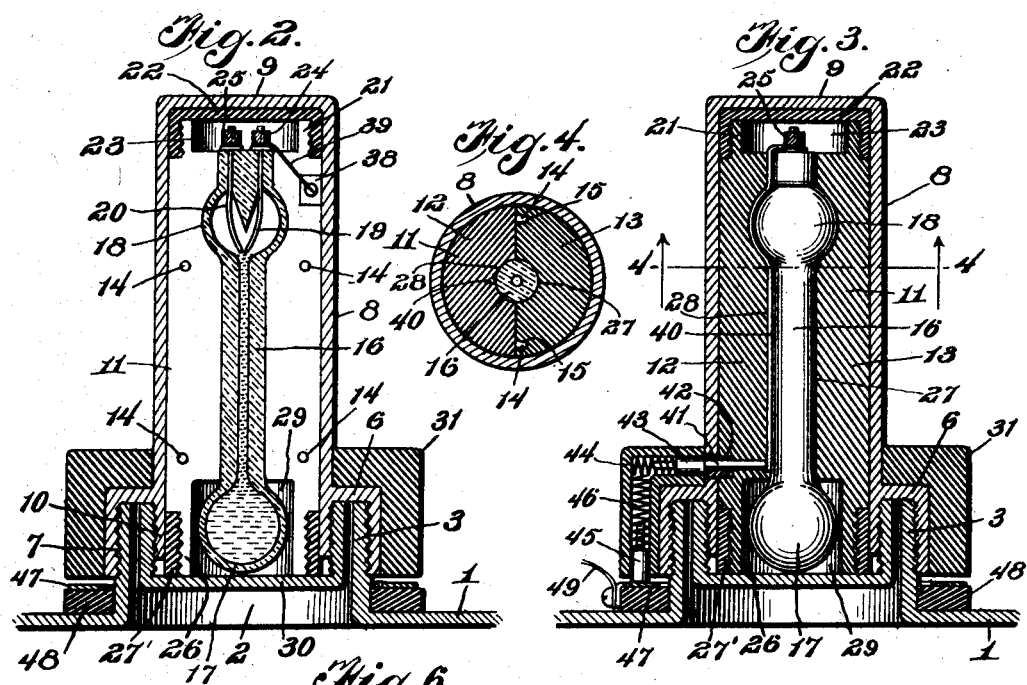
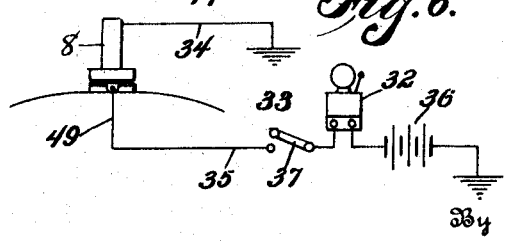
Inventor
A. M. de S. Greaves
By
Attorney.

A. M. DE S. GREAVES.
TEMPERATURE ALARM SYSTEM FOR RADIATORS OF MOTOR VEHICLES.
APPLICATION FILED JAN. 16, 1920.
1,386,492.
Patented Aug. 2, 1921.
2 SHEETS—SHEET 2.
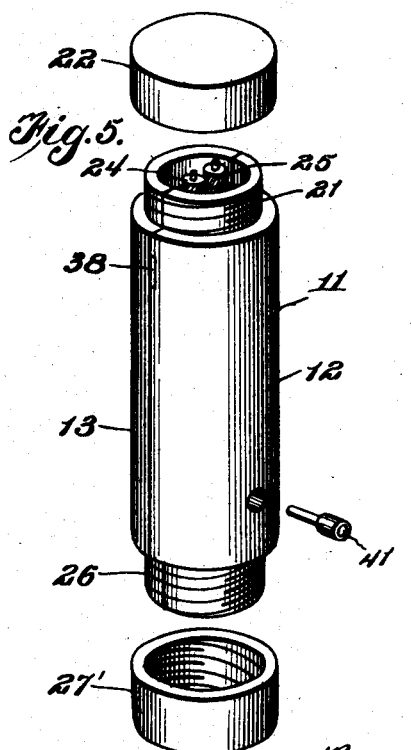
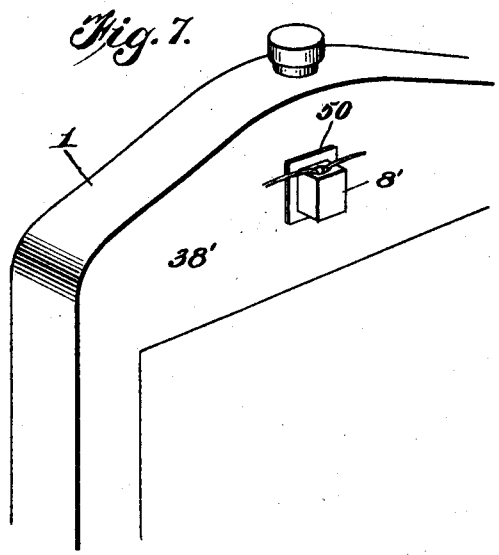
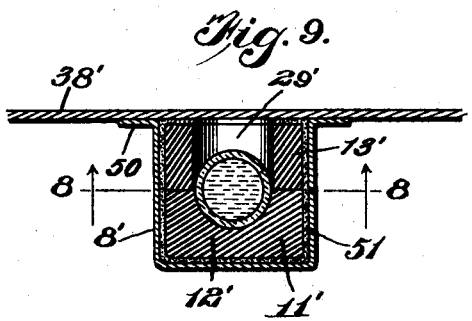
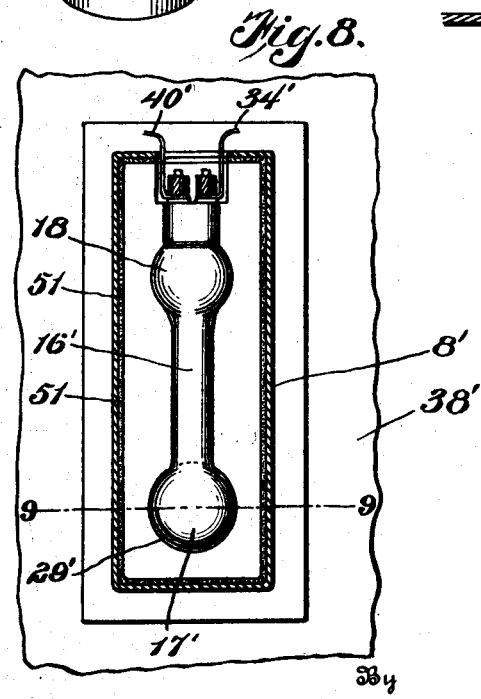
Inventor
A. M. de S. Greaves
Attorney

UNITED STATES PATENT OFFICE.

ABILIO M. DE SILVA GREAVES, OF CAMBRIDGE, MASSACHUSETTS.

TEMPERATURE-ALARM SYSTEM FOR RADIATORS OF MOTOR-VEHICLES.

1,386,492. Specification of Letters Patent. Patented Aug. 2, 1921.

Application filed January 16, 1920. Serial No. 351,811.

*To all whom it may concern:*

Be it known that I, ABILIO MARIA DE SILVA GREAVES, a citizen of Portugal, residing at Cambridge, in the county of Middlesex and State of Massachusetts, have invented new and useful Improvements in Temperature-Alarm Systems for Radiators of Motor-Vehicles, of which the following is a specification.

This invention relates to an apparatus for indicating the temperature conditions of the radiators of automobile and like internal combustion motors and giving a warning alarm or signal when the temperature approaches or reaches a danger point or predetermined temperature degree.

The primary object of my invention is to provide an alarm system for automobiles of the character and for the purpose described which includes a circuit-closing thermostat and an alarm device together with connecting means for including the same in the electrical (ignition and lighting) system of the automobile, whereby such electrical system may be utilized as a part of the means composing the temperature alarm system for giving the desired signal when the temperature of the cooling liquid rises above a certain point.

Another object of my invention is to provide a thermostat the shell or inclosing casing of which forms a component part of the radiator cap, and wherein provision is made for causing the expansible circuit-closing medium of the thermostat to be influenced and affected by heat changes transmitted from the source of generated heat through a metallic heat conductor, whereby a high degree of efficiency of action is secured.

In the accompanying drawings showing certain embodiments of my invention, for purposes of exemplification in the carrying of the invention into practical effect,—

Figure 1 is a perspective view of a portion of an automobile showing the application of my invention thereto.

Fig. 2 is a vertical section through the radiator cap, thermostat, and upper portion of the radiator.

Fig. 3 is a vertical section of the same taken in a plane at right angles to the plane of section shown in Fig. 2.

Fig. 4 is a horizontal section on line 4—4 of Fig. 3.

Fig. 5 is a view of elements of the thermostat removed from the outer casing and with certain features disconnected and in proper relative position for assemblage.

Fig. 6 is a diagrammatic view of the elements of the alarm apparatus.

Fig. 7 is a perspective view of a portion of a radiator, showing the application thereto of a modified form of the invention.

Fig. 8 is a vertical transverse section through the modified form of thermostat, taken on line 8—8 of Fig. 9.

Fig. 9 is a horizontal section on the line 9—9 of Fig. 8.

Referring to the drawings, and particularly to Figs. 1 to 6 inclusive, 1 designates the radiator of an automobile having the usual filling opening 2 provided with the upstanding internally threaded nipple 3, 4 the engine hood or cover of the automobile, and 5 the instrument board thereof, it being understood that these parts of the vehicle may be of any of the forms or constructions in general use.

A temperature controlled circuit-closing device or thermostat is provided in accordance with my invention, and is so constructed as to be carried by and form a component part of the radiator cap 6, which cap, as shown, is provided with an internally threaded flange 7 to engage the external threads of the nipple 3, whereby the opening 2 is normally closed. The said thermostat or temperature controlled circuit closing device includes an outer metallic shell or casing 8 which is integral with and rises from the crown wall of the cap 6, said casing having a closed upper end 9 and being open at its lower end and provided with an externally threaded portion 10 projecting into the space bounded by and arranged concentric with the flange 7.

Inclosed within the outer metallic shell or casing 8 is a core 11 comprising a pair of semi-cylindrical sections 12 and 13, composed of baked clay, porcelain or other suitable insulating material. This core is of a diameter and length substantially equal in diameter and length to the casing 8 and is adapted to fit snugly therein. Suitable means, such as dowel pins 14 upon one section are provided to enter dowel seats or recesses 15 in the other section, whereby said core sections are properly centered and detachably held in fixed relation when not otherwise fastened together.

The core sections form the complemental parts of an inner shell or casing for a mercury tube 16 having its lower end provided with a mercury containing bulb 17, the tube being enlarged adjacent to its upper end to provide an expansion chamber 18 into which the mercury column enters when the column ascends under the influence of heat. Extending downwardly into this chamber 18 are normally spaced conducting terminals 19 and 20 adapted to be connected by the mercury ascending into the chamber 18 to complete the indicating circuit when the temperature reaches a predetermined degree, as hereinafter described.

The sections 12 and 13 of the two-part inner casing are formed at their upper ends with complemental members 21 providing an externally threaded annular flange adapted to be engaged by an internally threaded cap 22 of non-conducting material, whereby said casing sections are coupled at their upper ends. The said flange also provides a chamber or compartment 23 to receive binding nuts or terminals 24 and 25 engaging the upper ends of the conducting terminals 19 and 20. The lower ends of the inner casing sections 12 and 13 are similarly formed with complemental portions to provide an externally threaded annular flange 26 adapted to be engaged by an internally threaded ring 27' of non-conducting material, whereby said casing sections are coupled at their lower ends. The meeting faces of the casing sections are formed with channels 27 and 28 to receive and accommodate the body portion and expansion chamber of the thermometer tube, which is cemented or otherwise suitably secured to the casing section 12, while said casing sections are formed with recesses at their lower ends providing a cavity 29 to receive the bulb 17.

Engaging the threaded lower end 10 of the outer casing 8 is a combined closure cap and heat conducting member 30, made of metal or other material of high heat conducting capacity. This cap 30 secures the inner casing and thermostat held thereby in position within the outer casing 8, and at the same time closes the cavity or compartment 29 against communication with the opening 2 and upper portion of the radiator 1. The construction of the combined radiator cap and thermostat, forming a component part thereof, is preferably completed by providing the cap body 6 and its flange 7 with an outer flanged ring, layer or covering 31 of hard vulcanized rubber, fiber or other non-heat conducting and non-electric conducting material, which not only gives an ornamental effect but further serves to protect the hand of the user against possible electric discharges or shocks and also to diminish loss of heat about and within the zone or region of the bulb 17 of the thermostat. It will be understood from the construction described that the cap 30 normally holds the inner core and thermostatic tube in position within the outer casing 8, but that upon detaching said cap 30 after removal of the device from the neck 3, the inner casing and thermostatic tube may be readily and conveniently withdrawn from the outer casing and access to the inclosed parts obtained by simply disconnecting the sections 12 and 13 of the core from each other, whereupon the internal parts of the device will be exposed, such construction also allowing of the ready and convenient assemblage of the parts in the production of the complete thermostatic device. It will be understood, of course, that the outer casing 8 may also be employed to support any desired radiator ornament, figure or emblem designed to be employed to give a desired finish to the radiator cap or to suit the taste or fancy of the owner of the automobile in the equipment of his car with devices of this character.

Supported upon the instrument board 5, or some other suitable portion of the vehicle, is an indicator, preferably in the form of an aural alarm or signal, such as a bell 32, arranged within an indicating or alarm circuit 33 diametrically shown in Fig. 6, which circuit may be and preferably is a part of the electrical system of the car, such as is commonly employed for ignition and lighting purposes. This circuit, as shown, is of the single-wire type, said circuit including grounded conductors 34 and 35. The bell or signal 32 is arranged in the conductor 35 which also has arranged therein a battery or other source of energy 36 which may be the generator or storage battery of the electrical system of the car. This circuit is adapted to be closed or energized by the thermostat when the column of mercury, at a predetermined temperature, expands into the chamber 18 and comes in engagement with and electrically connects the two contacts 19 and 20, whereupon the signal 32 will be operated to give notice to the operator of the car that the temperature has reached the danger point and that measures should be taken to correct any deficiency which may exist or imperfection causing undue heating of the motor, such as imperfect lubrication and insufficient amount of cooling water or any other defect causing an undue increase of temperature. It will, of course, be understood that the alarm will be caused to sound as long as this condition exists, but in order to enable the operator to arrest the action of the alarm and prevent waste of electric energy, after his attention has been called to the danger condition existing, a switch device 37 of a suitable type is provided in the conductor 35 whereby the circuit may be broken until normal conditions are again restored. The grounded conductors 34 and 35 may consist, in whole or part, of suitable insulated portions of the metallic elements of the vehicle body, and to complete the circuit connections through the thermostatic device and radiator cap suitable conducting connections are provided. These consist preferably of a metallic conducting member or contact 38 set in a recess in one of the core sections and electrically connected through a conducting wire 39 with the binding post 24 associated with the contact terminal 19, and leading from the other binding post 25 associated with the conducting terminal 20 is a conducting wire 40 preferably countersunk and secured in the groove or recess in which the tube 16 is cemented. This wire 40 extends downwardly to a point in proximity to the cavity 29 and is engaged by a contact pin 41 slidably fitted in registering bores in the core and shell 8 and insulated from said shell by a non-conducting bushing 42. The pin engages a sliding contact 43 mounted in a suitable channel in the cap covering 31, which contact 43 is pressed into engagement with the pin 41 by a spring 44. It will be observed that the pin 41 is independent of connection therewith, thus allowing the core to be applied and removed in an obvious manner without interference from said contact 43. A second pin 45 is mounted for vertical movement in a bore in the cap covering 31 and is normally pressed downwardly by a spring 46, the springs 44 and 46 being in engagement and forming an electrical conducting connection between the two contact pins. The pin 45 engages a metallic conducting ring 47 carried by a collar 48 of non-conducting material resting upon the radiator top and surrounding the base of the nipple 3, said ring 47 having attached thereto a conductor 49 suitably connected with the conductor 35, whereby the circuit connections are applied. It will therefore be evident that when the contacts 19 and 20 are connected by the column of mercury ascending in the mercury tube beyond a certain point the electric circuit will be energized to operate the alarm 32, thus giving a positive warning signal that the motor is overheated and requires the immediate attention of the operator of the vehicle, and it will also be evident that the thermostatic radiator cap constituting my invention may be applied in place of an ordinary radiator cap and the alarm device and thermostat readily and conveniently connected up with the electrical system of the car.

An important feature of my invention resides in the fact that by the provision of the cap 30 the thermo-member is closed against direct communication with the opening 2 and space or chamber in the upper part of the radiator above the level of the cooling liquid, and hence does not come in direct contact with hot water or steam bubbling up from the body of liquid or generated therefrom when the temperature within the radiator rises to an abnormal degree, and consequently the bulb is not liable to be fractured or the mercury affected by intensely abrupt temperature changes liable to cause breaking of or other damage to the thermostatic device or to cause such device to be impaired in any manner so that it will not perform its intended function of closing the electric circuit and giving a positive warning when danger exists. I avoid such liability of deleterious action by providing the cap 30 which not only performs the function described, but further serves as a metallic body or conductor which is influenced by the temperature changes in the radiator and transmits such temperature changes to the mercury contained in the bulb 17 of the thermostat, which lies in close proximity to the body of the cap. By the use of such a water and steam excluding barrier and conductor, temperature changes may be sensitively transmitted so as to operate the thermostat in a reliable and efficient manner without danger of injury thereto by liability of steam or hot water coming directly in contact with the bulb, and such temperature changes transmitted by the metallic conductor will be an accurate indication of the temperature condition of the engine and will avoid the liability of giving false alarms such as might occur through high temperature changes in the upper portion of the radiator above the level of the cooling water, due sometimes to local conditions and not giving a temperature condition corresponding to that of the engine. It is well known that, through local conditions in the radiator, the temperature often rises therein to a sufficient extent to cause the generation of steam or the bubbling of hot water up into the nipple, such as would be liable to cause fracture of the thermostat bulb under some conditions with a loss of the mercury and liability of the alarm system being entirely disrupted and thrown out of action, which contingency my construction entirely avoids.

In practice the outer flange section 31 of the cap need not be rigidly fixed to the fixed cap flange 6, but may be forced thereon with a press-fit so that it may be removed when required, suitable fastening means, such as screws, being employed to secure it against displacement. By this means the said cap section may be detached when desired, carrying with it the contact 43 and allowing the parts 41 and 42 to be withdrawn so that the core 11 and tube 16 may be detached from the shell 8 for inspection, repairs or other purposes.

In Figs. 7, 8 and 9 I have shown a modified form of my invention in which the thermostatic device instead of being in the form of a cap is adapted to be applied to one of the walls of the radiator body. With this form I employ an outer metallic casing 8', a two-part insulated core 11' consisting of the sections 12' and 13' and a mercury tube 16', said core and tube having generally the features of construction hereinbefore described. As shown, however, the outer casing is open at one side facing the radiator wall 38', and provided at such side wall with a marginal flange 50 brazed, soldered or otherwise secured to said wall, while between the core and outer casing is interposed a non-conducting lining 51 of asbestos or other suitable material. This lining insulates the tube 16' from the heat of the radiator except at one point, at which point the core section 13' and lining 51 are apertured, as shown at 29', in line with the bulb 17', thus exposing the bulb to the heat transmitted thereto from the radiator through the metallic surface 38'. Thus in this instance also a metallic surface is interposed between the bulb and cooling liquid in the radiator and the heat is transmitted through such metallic surface to the bulb, simplicity being secured in this construction by a form of device which takes advantage of a wall of the radiator itself as a barrier and conducting surface. The circuit conductors here shown attached to the binding posts 34' and 40' are intended to be used in an electrical alarm system such as described and may be coupled into the circuit for such purpose in an obvious manner. With this construction I may, however, use a single-wire circuit as previously described or a two-wire circuit, as desired.

Having thus fully described my invention, I claim:

1. In a thermostatic alarm device, a casing adapted to be applied to a radiator and having an open portion facing the radiator, a thermostatic device in said casing and including a portion influenced by temperature changes in the radiator arranged in proximity to said opening, and a conducting surface closing said opening and forming a thermic-conductor between said temperature influenced portion of the thermostat and the interior of the radiator.

2. In an alarm device for the cooling systems of automobiles, a radiator having an opening therein, a casing secured to the radiator in line with and forming a closure for said opening in the radiator, said casing having an open portion facing said opening in the radiator, a thermostatic device arranged within said casing and including means responsive to temperature variations disposed in proximity to said open portion of the casing, and a metallic conducting barrier between said opening in the radiator and said temperature responsive means of the thermostatic device, said barrier detachably closing said open portion of the casing.

3. In an alarm device for the cooling systems of automobiles, a radiator, a casing secured to the radiator and having an open portion facing the radiator, a body arranged within the casing, a thermostat supported by said body and including means responsive to temperature variations exposed at said opening, and a metallic surface closing the opening and separating the thermostat from direct communication with the interior of the radiator, said metallic surface forming a conductor for transmitting the temperature variations to the thermostat.

4. In an alarm device for the cooling systems of automobiles, a radiator having a filling inlet, a casing forming a closure cap for said inlet, said casing having an open portion facing the inlet, a body within the casing, a thermostatic device supported by the body, said thermostatic device having a portion arranged in proximity to the open portion of the casing and influenced by temperature changes in the radiator, and a detachable closure for the open portion of the casing separating said temperature influenced portion of the thermostat from the interior of the radiator and forming a thermic conductor between said portion of the thermostat and the interior of the radiator.

5. In an alarm device for the cooling systems of automobiles, the combination of a radiator, a casing having an open portion facing the radiator, a two-part body composed of separable sections disposed within the casing and insertible and removable through said open portion thereof, a thermostat held within said separable portions of the body and having a portion disposed in proximity to the open portion of the casing and influenced by temperature changes in the radiator, and a closure member detachably connected with the open portion of the casing and separating said temperature influenced portion of the thermostat from the fluid contents of the radiator, said closure forming a thermic conductor between said temperature influenced portion of the thermostat and the interior of the radiator.

6. In a thermostatic alarm device, a radiator, a casing having an opening therein facing the radiator, a thermostatic device in said casing and including a thermo-tube having a bulb portion disposed in proximity to said opening, and a conducting surface closing said opening and forming a thermic-conductor between said bulb and the interior of a radiator.

7. In a thermostat alarm, a casing adapted to be applied to a radiator and having an open portion facing the radiator, a body of insulating material within said casing, a thermostatic device supported by said body and including a thermo-tube having a bulb portion disposed in proximity to said opening, and a metallic closure for the opening forming a thermic-conductor for influencing the thermostat.

In testimony whereof I affix my signature.

ABILIO M. DE SILVA GREAVES.